(12) United States Patent
Lin et al.

(10) Patent No.: US 12,153,753 B1
(45) Date of Patent: Nov. 26, 2024

(54) FOLDABLE TOUCH DISPLAY PANEL, ELECTRONIC DEVICE AND DRIVER CIRCUIT

(71) Applicant: Novatek Microelectronics Corp., Hsinchu (TW)

(72) Inventors: Yi-Ying Lin, Hualien County (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/474,206

(22) Filed: Sep. 25, 2023

(51) Int. Cl.
*G06F 3/044* (2006.01)
*G06F 1/16* (2006.01)
*G06F 3/041* (2006.01)

(52) U.S. Cl.
CPC .......... *G06F 3/0412* (2013.01); *G06F 1/1641* (2013.01); *G06F 1/1677* (2013.01)

(58) Field of Classification Search
CPC ..... G06F 3/0412; G06F 1/1641; G06F 1/1677
See application file for complete search history.

(56) References Cited

U.S. PATENT DOCUMENTS

| | | | | |
|---|---|---|---|---|
| 11,209,914 B1* | 12/2021 | Hu | ............ | G06F 3/0338 |
| 11,573,663 B1* | 2/2023 | Yun | ............ | G06F 1/1643 |
| 2016/0109973 A1* | 4/2016 | Kim | ............ | G06F 3/04886 |
| | | | | 345/173 |
| 2017/0115691 A1 | 4/2017 | Aurongzeb et al. | | |
| 2017/0212637 A1 | 7/2017 | Choi et al. | | |
| 2017/0285837 A1* | 10/2017 | Zeng | ............ | G06F 1/1641 |
| 2017/0322596 A1* | 11/2017 | Zhao | ............ | G06F 1/1605 |
| 2018/0088633 A1* | 3/2018 | Whitman | ............ | G06F 1/1677 |
| 2019/0042042 A1* | 2/2019 | Hei | ............ | G06F 3/0443 |
| 2019/0064950 A1* | 2/2019 | Hsu | ............ | G06F 1/1616 |
| 2022/0075473 A1 | 3/2022 | Huang | | |
| 2022/0197437 A1 | 6/2022 | Li et al. | | |

FOREIGN PATENT DOCUMENTS

CN 116027886 4/2023

OTHER PUBLICATIONS

"Office Action of Taiwan Counterpart Application", issued on Jul. 16, 2024, p. 1-p. 9.

* cited by examiner

*Primary Examiner* — Sanghyuk Park
(74) *Attorney, Agent, or Firm* — JCIPRNET

(57) ABSTRACT

An electronic device including a foldable touch display panel and a driver circuit is provided. The foldable touch display panel includes a foldable substrate and a plurality of touch sensors. The foldable substrate includes a first portion and a second portion. The first portion and the second portion face each other in a folded state. The driver circuit is coupled to the foldable touch display panel. The driver circuit is configured to drive the foldable touch display panel to perform a touch sensing operation in a touch sensing state. The driver circuit is configured to determine a folding angle between the first portion and the second portion according to a capacitance variation of the touch sensors in the folded state.

16 Claims, 16 Drawing Sheets touch sensing state folded state touch sensing state folded state touch sensing state folded state

FOLDABLE TOUCH DISPLAY PANEL, ELECTRONIC DEVICE AND DRIVER CIRCUIT

BACKGROUND

Technical Field

The invention relates to a touch display panel, an electronic device and a driver circuit, and more particularly to a foldable touch display panel, an electronic device and a driver circuit.

Description of Related Art

With the advancement of display technology, foldable displays have become more mature in recent years. Electronics manufacturers have actively participated in their development and application, particularly integrating them into smartphones, tablet PCs, and notebook computers. In the related art, the folding angle of the foldable displays is detected using Hall sensors and gravity sensors. However, Hall sensors and gravity sensors may occupy space and increase the cost of components, as well as introduce electromagnetic interference.

SUMMARY

The invention is directed to a foldable touch display panel, an electronic device, and a driver circuit that detect the folding angle of the foldable touch display panel using touch sensors. This can decrease components costs and reduce electromagnetic interference.

An embodiment of the invention provides a foldable touch display panel including a foldable substrate, a plurality of first touch sensors, a plurality of second touch sensors. The foldable substrate includes a first portion and a second portion. The first portion and the second portion face each other in a folded state. The plurality of first touch sensors are disposed on the first portion of the foldable substrate. The plurality of second touch sensors are disposed on the second portion of the foldable substrate. A folding angle between the first portion and the second portion is determined according to a capacitance variation of the first touch sensor and the second touch sensor.

In an embodiment of the invention, in the folded state, the first touch sensors are grouped into at least one first sensing group and the second touch sensors are grouped into at least one second sensing group. The angle folding is determined according to the capacitance variation of the at least one first sensing group and the at least one second sensing group.

In an embodiment of the invention, in the folded state, a first driving signal is applied to the at least one second sensing group and a second driving signal is applied to the at least one first sensing group to determine the folding angle. The second driving signal is different from the first driving signal.

In an embodiment of the invention, the first driving signal is applied to the first touch sensors and the second touch sensors to perform a touch sensing operation in a touch sensing state.

In an embodiment of the invention, the foldable touch display panel further includes a plurality of third touch sensors. The plurality of third touch sensors are disposed on the first portion and the second portion of the foldable substrate. The first driving signal is applied to the third touch sensors to perform a touch sensing operation in a touch sensing state.

In an embodiment of the invention, the second driving signal is applied to the first touch sensors and the second touch sensors to perform the touch sensing operation in the touch sensing state.

In an embodiment of the invention, a third driving signal is applied to the third touch sensors in the folded state.

In an embodiment of the invention, the first touch sensors are further grouped into at least one third sensing group. The at least one third sensing group serve as dummy sensors and are not configured to determine the folding angle in the folded state.

In an embodiment of the invention, the second touch sensors are further grouped into at least one fourth sensing group. The at least one fourth sensing group serve as dummy sensors, and are not configured to determine the folding angle in the folded state.

In an embodiment of the invention, the folding angle decreases as the capacitance variation increases.

An embodiment of the invention provides an electronic device including a foldable touch display panel and a driver circuit. The foldable touch display panel includes a foldable substrate, a plurality of first touch sensors, and a plurality of second touch sensors. The foldable substrate includes a first portion and a second portion. The first portion and the second portion face each other in a folded state. The plurality of first touch sensors are disposed on the first portion of the foldable substrate. The plurality of second touch sensors are disposed on the second portion of the foldable substrate. The driver circuit is coupled to the foldable touch display panel. The driver circuit is configured to drive the foldable touch display panel to perform a touch sensing operation in a touch sensing state. The driver circuit is configured to determine a folding angle between the first portion and the second portion according to a capacitance variation of the first touch sensor and the second touch sensor in the folded state.

In an embodiment of the invention, in the folded state, the first touch sensors are grouped into at least one first sensing group and the second touch sensors are grouped into at least one second sensing group. The driver circuit determines the angle folding according to the capacitance variation of the at least one first sensing group and the at least one second sensing group.

In an embodiment of the invention, the driver circuit outputs a first driving signal and a second driving signal to determine the folding angle in the folded state. The first driving signal is applied to the at least one second sensing group, and the second driving signal is applied to the at least one first sensing group. The second driving signal is different from the first driving signal. In an embodiment of the invention, the driver circuit outputs the first driving signal to drive the first touch sensors and the second touch sensors to perform the touch sensing operation in the touch sensing state.

In an embodiment of the invention, the foldable touch display panel further includes a plurality of third touch sensors. The plurality of third touch sensors are disposed on the first portion and the second portion of the foldable substrate. The driver circuit outputs the first driving signal to drive the third touch sensors to perform the touch sensing operation in the touch sensing state.

In an embodiment of the invention, the driver circuit outputs the second driving signal to drive the first touch sensors and the second touch sensors to perform the touch sensing operation in the touch sensing state.

In an embodiment of the invention, the driver circuit outputs a third driving signal to the third touch sensors in the folded state.

An embodiment of the invention provides a driver circuit coupled to the foldable touch display panel. The driver circuit is configured to drive the foldable touch display panel to perform a touch sensing operation in a touch sensing state. The driver circuit is configured to determine a folding angle between the first portion and the second portion according to the capacitance variation of the first touch sensor and the second touch sensor in the folded state.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
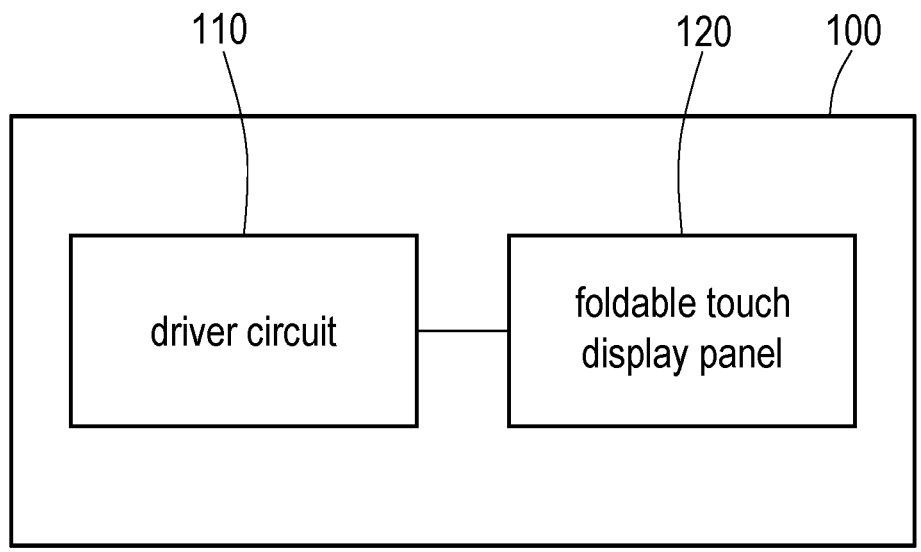
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 includes a driver circuit 110 and a foldable touch display panel 120. The foldable touch display panel 120 includes display pixels and touch sensors. The foldable touch display panel 120 can be folded in a folded state. The driver circuit 110 is configurable to be coupled to the foldable touch display panel 120. The driver circuit 110 is configured to drive the foldable touch display panel 120 to perform a display operation and a touch sensing operation.

In the present embodiment, the driver circuit 110 is also configured to determine a folding angle of the foldable touch display panel 120 according to a capacitance variation of the touch sensors when the foldable touch display panel 120 is folded. For example, in the folded state, the folding angle between the first portion and the second portion of the foldable touch display panel 120 may be determined according to the capacitance variation of the first touch sensors and the second touch sensors, wherein the first touch sensors are disposed on the first portion, and the second touch sensors are disposed on the second portion.

In an embodiment, the electronic device 100 may be, but not limited to, a smartphone, a non-smart phone, a wearable electronic device, a tablet computer, a personal digital assistant, a notebook and other portable electronic devices that can operate independently and have the display function and the touch sensing function. In an embodiment, the electronic device 100 may be, but not limited to, a portable or un-portable electronic device in a vehicle intelligent system.

In an embodiment, the driver circuit 110 may include a display driving circuit, a touch sensing circuit and a fingerprint sensing circuit and be implemented as a single chip integrated circuit that can drive and control the foldable touch display panel 120 to perform the display operation, the touch sensing operation and/or a fingerprint sensing operation. The driver circuit 110 may include a control circuit, and the control circuit may be a micro-controller based core to perform all of control activities of the display operation, the touch sensing operation and/or the fingerprint sensing operation. The control circuit may include at least one of a timing controller, a touch controller, a digital circuit, and the other controllers or processors of the display driving circuit, the touch sensing circuit and the fingerprint sensing circuit.

Figure 2:
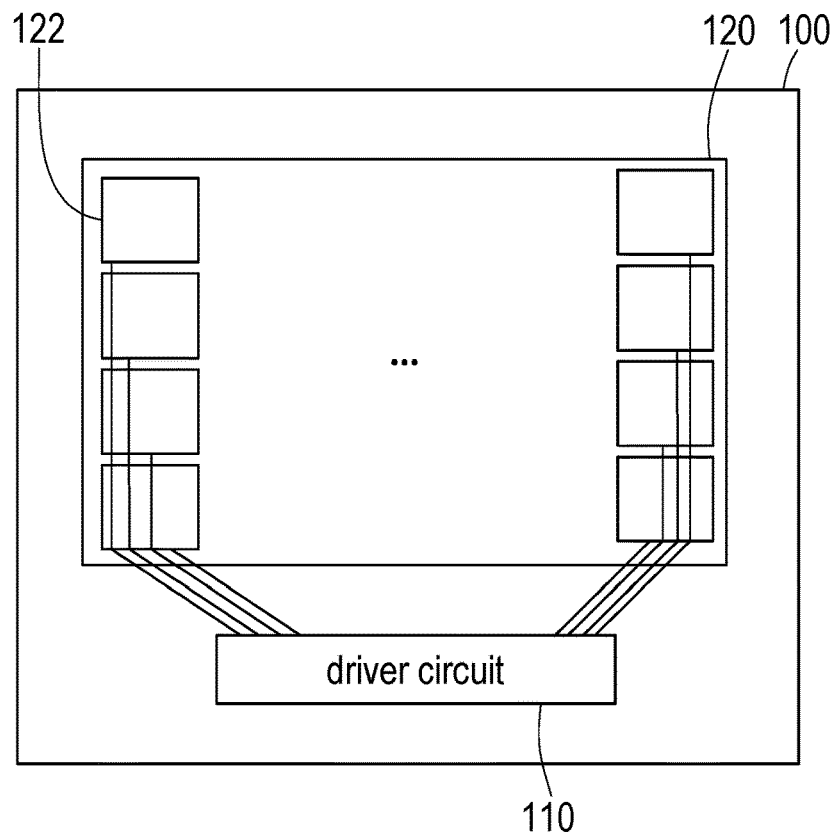
FIG. 2 is a schematic diagram illustrating an electronic device according to another embodiment of the invention.

FIG. 2 is a schematic diagram illustrating an electronic device according to another embodiment of the invention. Referring to FIG. 2, a plurality of touch sensors 122 are further depicted in FIG. 2. The touch sensors 122 are block electrodes and arranged in an array on a foldable substrate of the foldable touch display panel 120. The driver circuit 110 outputs driving signals to drive the touch sensors 122 to perform the touch sensing operation in a touch sensing state.

Figure 3:
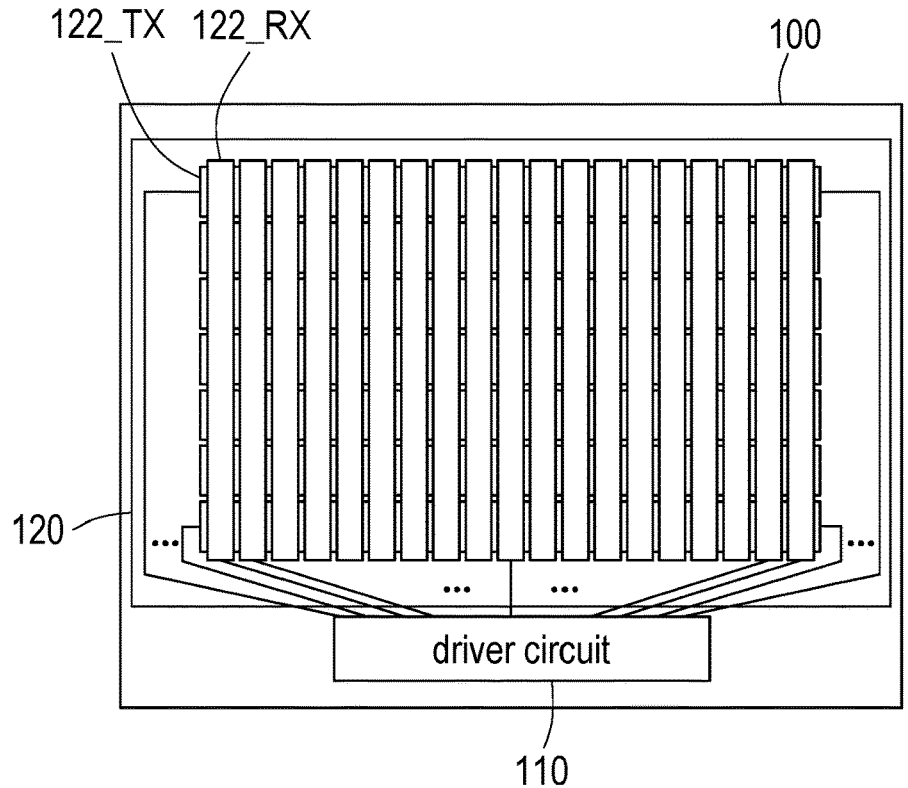
FIG. 3 is a schematic diagram illustrating an electronic device according to another embodiment of the invention.

FIG. 3 is a schematic diagram illustrating an electronic device according to another embodiment of the invention. Referring to FIG. 3, a plurality of driving electrodes 122_TX and sensing electrodes 122_RX are further depicted in FIG. 3. The driving electrodes 122_TX and the sensing electrodes 122_RX are strip electrodes arranged in different directions on a foldable substrate of the foldable touch display panel 120. The driver circuit 110 outputs driving signals to the driving electrodes 122_TX and receives sensing signals from the sensing electrodes 122_RX in the touch sensing state.

FIG. 4A to FIG. 4G respectively illustrate the foldable touch display panel which has different folding angles according to embodiments of the invention. Referring to FIG. 4A to FIG. 4G, the foldable touch display panel 120 includes a foldable substrate 124, a plurality of first touch sensors 122_1 and a plurality of second touch sensors 122_2. The foldable substrate 124 includes a first portion 241 and a second portion 242. The first touch sensors 122_1 are disposed on the first portion 241, and the second touch sensors 122_2 are disposed on the second portion 242. The first portion 241 and the second portion 242 can face each other in the folded state. The folding angle θ1, θ2, θ3, θ4, θ5, θ6 and θ7 between the first portion 241 and the second portion 242 of FIG. 4A, FIG. 4B, FIG. 4C, FIG. 4D, FIG. 4E, FIG. 4F and FIG. 4G are 180 degrees, 150 degrees, 120 degrees, 900 degrees, 60 degrees, 30 degrees and 0 degree, respectively. The folding angle θ between the first portion 241 and the second portion 242 can be determined according to a capacitance variation of the first touch sensor 122_1 and the second touch sensor 122_2.

The relationship between the capacitance variations and the folding angles may be stored in a memory circuit of the driver circuit 110 in a form of a lookup table. For example, table 1 shows the relationship between the capacitance variations and the folding angles and is stored in the memory circuit.

TABLE 1

| capacitance variations | folding angles (degrees) |
| --- | --- |
| ΔC1 | 180 |
| ΔC2 | 150 |
| ΔC3 | 120 |
| ΔC4 | 90 |

TABLE 1-continued

| capacitance variations | folding angles (degrees) |
| --- | --- |
| ΔC5 | 60 |
| ΔC6 | 30 |
| ΔC7 | 0 |

Other capacitance variations and folding angles that are not stored in the lookup table can be obtained by interpolation. The folding angle decreases as the capacitance variation increases. Therefore, the folding angle between the first portion 241 and the second portion 242 can be determined according to the lookup table, e.g. table 1, after the capacitance variation is calculated.

Figure 4A:
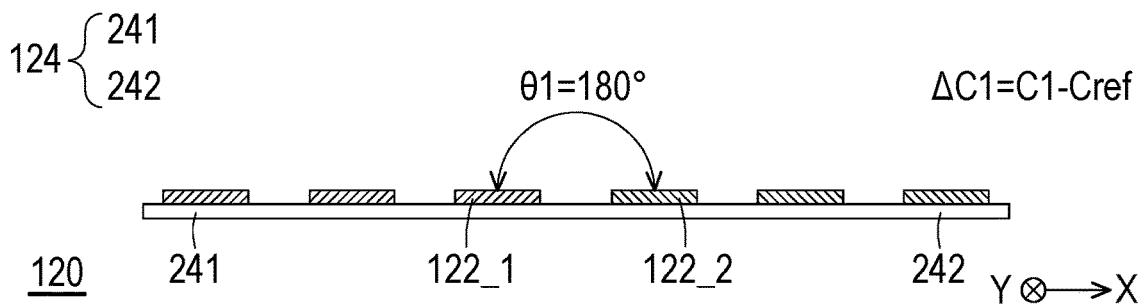
FIG. 4A, FIG. 4B, FIG. 4C, FIG. 4D, FIG. 4E, FIG. 4F and FIG. 4G respectively illustrate the foldable touch display panel which has different folding angles according to embodiments of the invention.
Figure 4B:
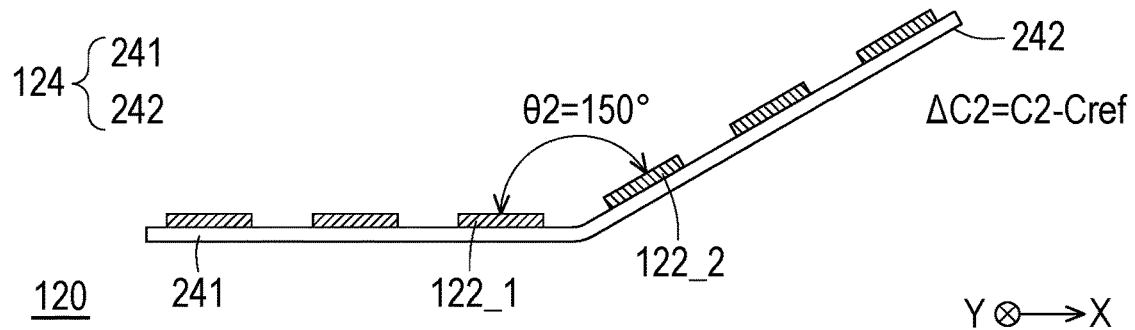

Taking FIG. 4A and FIG. 4B for example, in FIG. 4A, the folding angle θ1 is 180 degrees, and a capacitance value C1 between the first touch sensor 122_1 and the second touch sensor 122_2 can be taken as a reference Cref. In FIG. 4B, when the foldable touch display panel 120 is folded, a capacitor with a capacitance value C2 between the first touch sensor 122_1 and the second touch sensor 122_2 is generated and can be sensed, and thus a capacitance variation ΔC2 of the first touch sensor 122_1 and the second touch sensor 122_2 relative to the capacitance value Cref is calculated. That is, the capacitance variation ΔC2=C2−Cref can be calculated. The folding angle θ2 between the first portion 241 and the second portion 242 can be determined as 150 degrees according to the capacitance variation ΔC2 of the first touch sensor 122_1 and the second touch sensor 122_2 and the lookup table.

In table 1, the capacitance variation ΔC1 can be deemed as 0 since the capacitance variation ΔC1=C1−Cref=0 when the capacitance value C1 of the folding angle θ1 is taken as a reference to calculate capacitance variations.

Figure 4C:
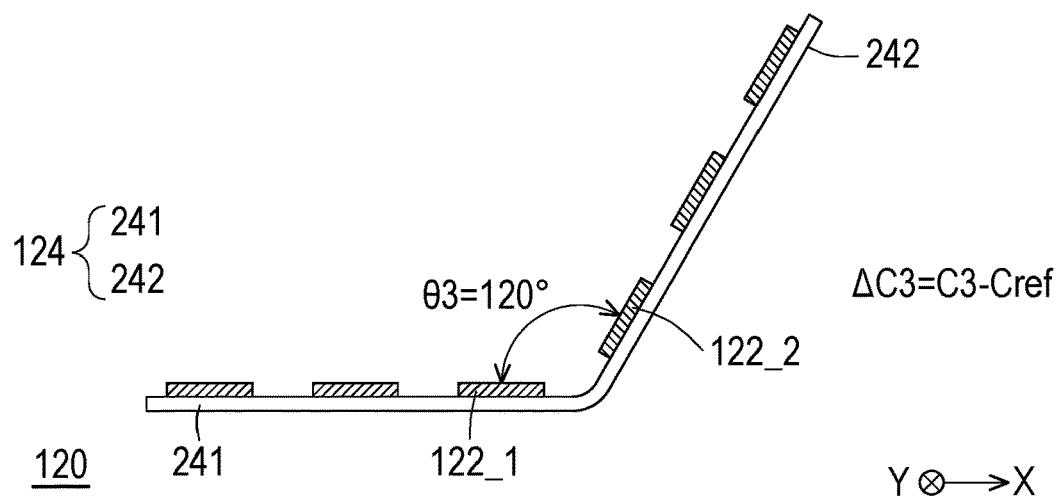
Figure 4D:
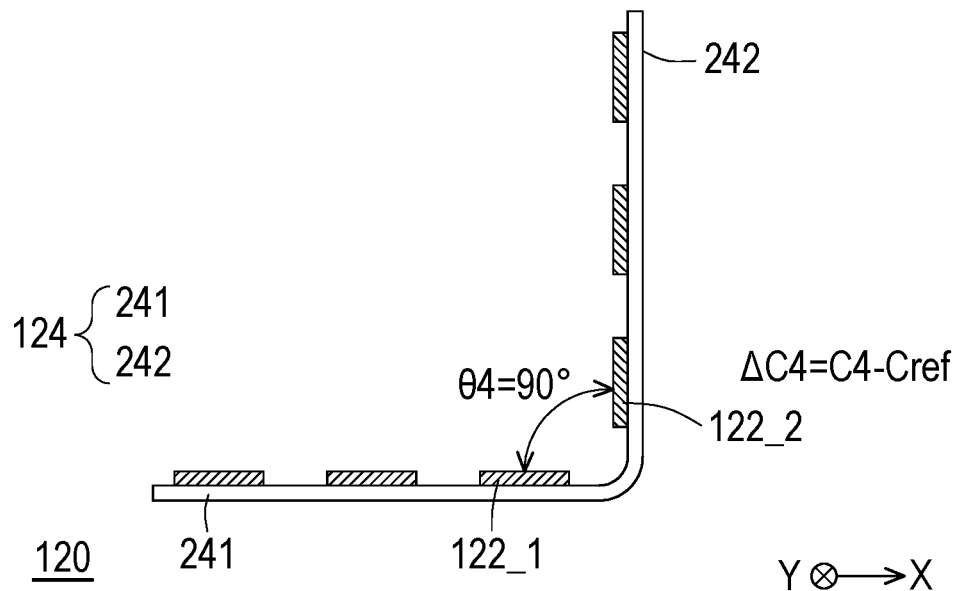
Figure 4E:
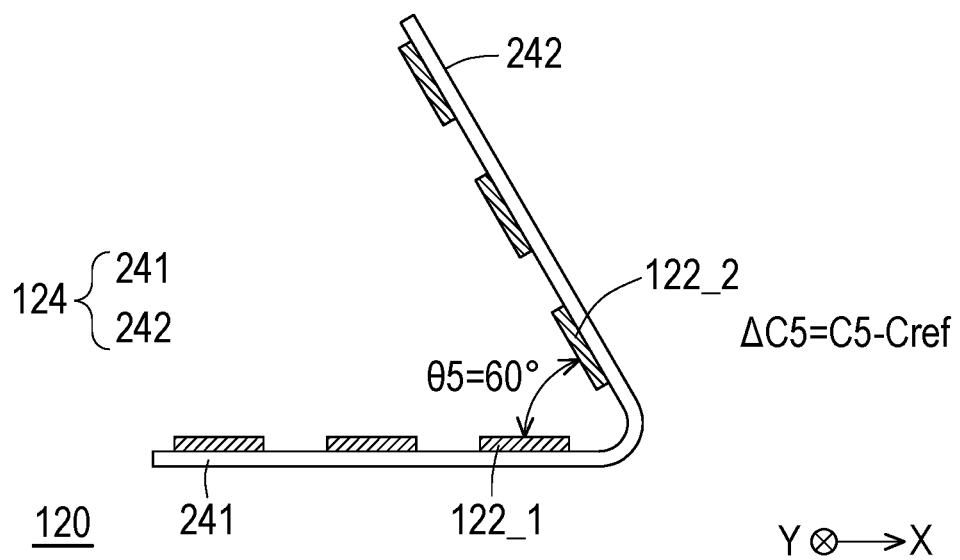
Figure 4F:
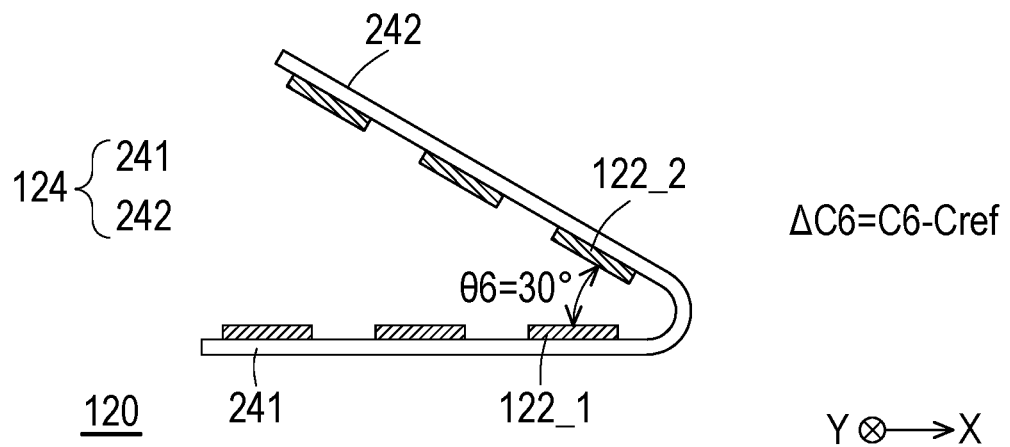
Figure 4G:
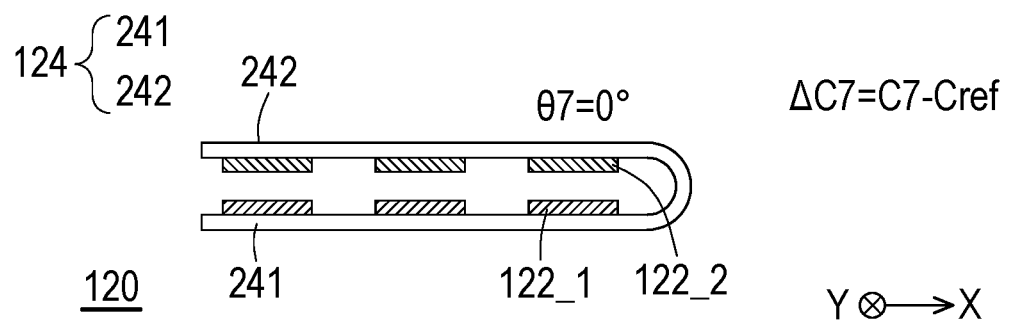

Taking FIG. 4A and FIG. 4C for another example, in FIG. 4C, a capacitor with a capacitance value C3 between the first touch sensor 122_1 and the second touch sensor 122_2 is generated and can be sensed, and thus a capacitance variation ΔC3 of the first touch sensor 122_1 and the second touch sensor 122_2 relative to the capacitance value Cref is calculated. That is, the capacitance variation ΔC3=C3−Cref can be calculated. The folding angle θ3 between the first portion 241 and the second portion 242 can be determined as 120 degrees according to the capacitance variation ΔC3 of the first touch sensor 122_1 and the second touch sensor 122_2 and the lookup table.

The folding angles θ4, θ5, θ6 and θ7 between the first portion 241 and the second portion 242 can be determined according to the capacitance variations ΔC4, ΔC5, ΔC6 and ΔC7 of the first touch sensor 122_1 and the second touch sensor 122_2 in a similar manner.

In the present embodiment, only seven capacitance variations and folding angles are stored in the lookup table, but the invention is not limited thereto. In an embodiment, 360 capacitance variations and folding angles can be stored in the lookup table. In the present embodiment, the capacitance value C1 of the folding angle θ1 is taken as a reference to calculate capacitance variations, but the invention is not limited thereto. In an embodiment, other capacitance values of the folding angles can also be taken as the reference to calculate capacitance variations.

In addition, the lookup table showing the relationship between capacitance variations and folding angles can be generated and pre-stored in the driver circuit for any given foldable touch display panel.

Figure 5A:
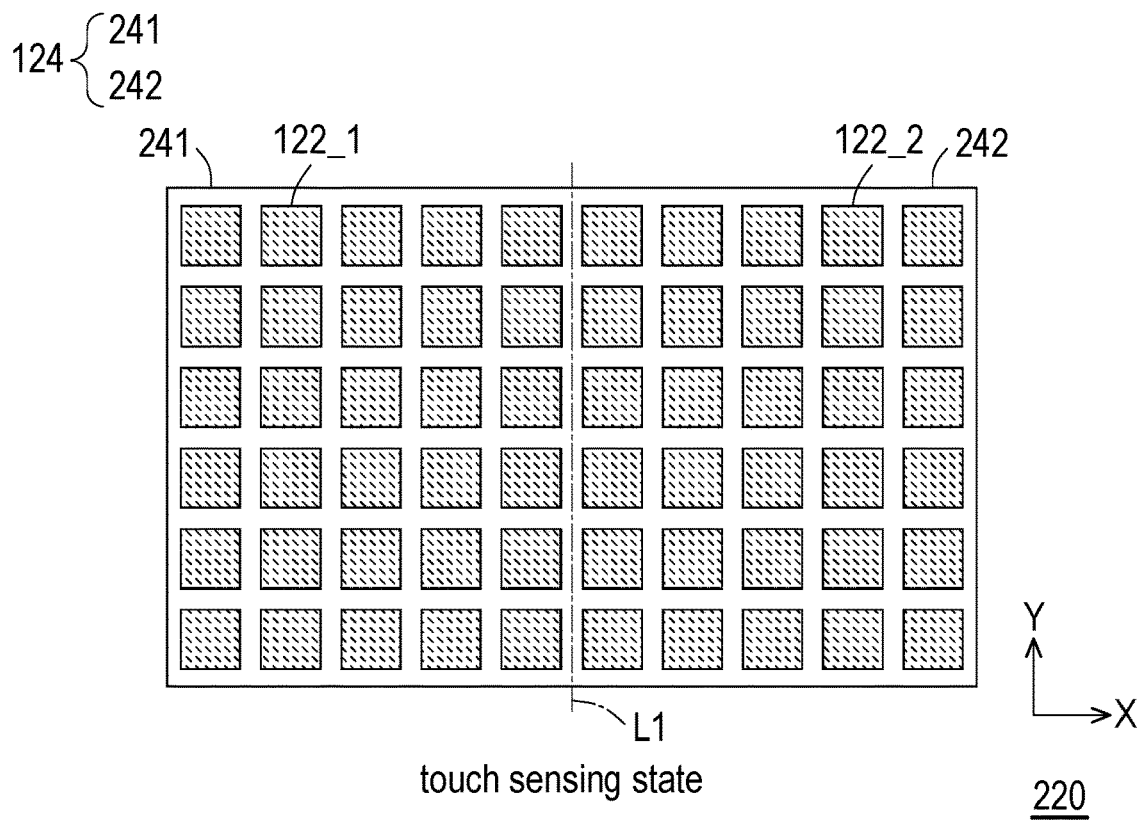
FIG. 5A illustrates a foldable touch display panel operating in a touch sensing state according to an embodiment of the invention.
Figure 5B:
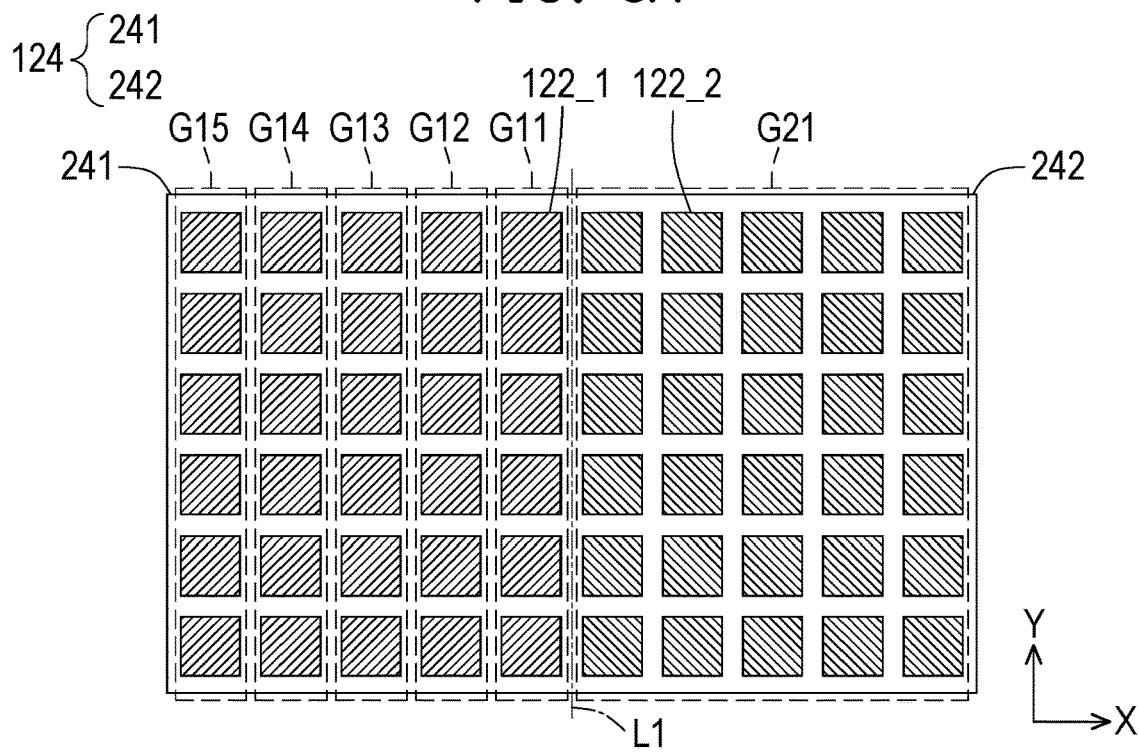
FIG. 5B illustrates the foldable touch display panel operating in a folded state according to an embodiment of the invention.
Figure 6:
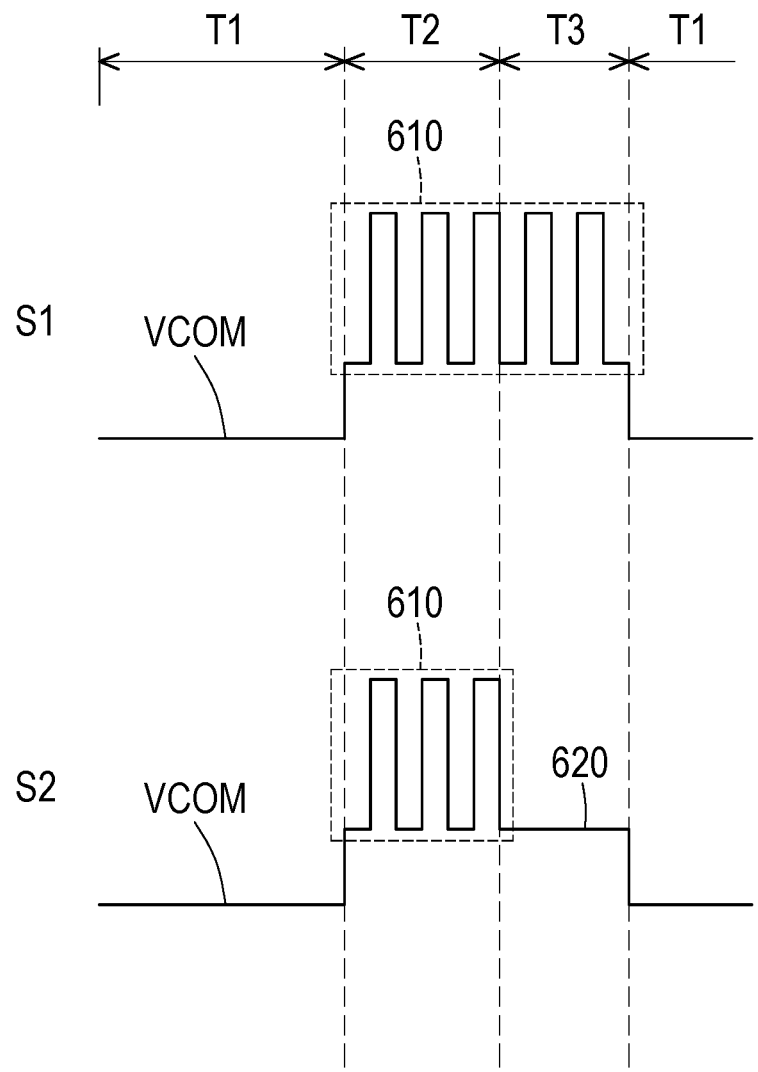
FIG. 6 illustrates driving signals for driving the foldable touch display panel of FIG. 5A and FIG. 5B according to an embodiment of the invention.

FIG. 5A illustrates a foldable touch display panel operating in a touch sensing state according to an embodiment of the invention. FIG. 5B illustrates the foldable touch display panel operating in a folded state according to an embodiment of the invention. FIG. 6 illustrates driving signals for driving the foldable touch display panel of FIG. 5A and FIG. 5B according to an embodiment of the invention.

Referring to FIG. 5A, FIG. 5B and FIG. 6, the driver circuit 110 may output signals S1 and S2 to drive the foldable touch display panel 220 to perform the display operation in the display state T1 and the touch sensing operation in the touch sensing state T2. The signal S1 is applied to the second touch sensors 122_2, and the signal S2 is applied to the first touch sensors 122_1. The foldable touch display panel 220 may be folded in the folded state T3. In the present embodiment, the foldable touch display panel 220 is folded in a first direction X with an axis L1 in the folded state, wherein the axis L1 is parallel to a second direction Y. The first portion 241 and the second portion 242 face each other when the foldable touch display panel 220 is folded. In an embodiment, when the foldable touch display panel 220 is not folded, the folded state T3 is omitted in FIG. 6.

In the display state T1, the first touch sensors 122_1 and the second touch sensors 122_2 may serve as common electrodes, and the driver circuit 110 outputs a common voltage VCOM to drive the first touch sensors 122_1 and the second touch sensors 122_2 to perform the display operation in the display state T1.

In the touch sensing state T2, the driver circuit 110 outputs a first driving signal 610 to drive the first touch sensors 122_1 and the second touch sensors 122_2 to perform the touch sensing operation. The first driving signal 610 is applied to the first touch sensors 122_1 and the second touch sensors 122_2.

In the folded state T3, the driver circuit 110 outputs the first driving signal 610 and a second driving signal 620 to determine the folding angle between the first portion 241 and the second portion 242 of the foldable touch display panel 220. The first driving signal 610 is applied to the second touch sensors 122_2, and the second driving signal 620 is applied to the first touch sensors 122_1. In the present embodiment, the first driving signal 610 is a square wave, and the second driving signal 620 is a DC voltage higher than the common voltage VCOM. The second driving signal 620 is different from the first driving signal 610. The waveforms of the first driving signal 610 and the second driving signal 620 are taken for example, and do not intend to limit the invention. The folding angle may be determined according to the capacitance variation of the first touch sensors 122_1 and the second touch sensors 122_2.

To be specific, in the folded state T3, the first touch sensors 122_1 are grouped into at least one first sensing group, and the second touch sensors 122_2 are grouped into at least one second sensing group. For example, the first touch sensors 122_1 are grouped into five first sensing groups G11, G12, G13, G14 and G15, and the second touch sensors 122_2 are grouped into one second sensing group G21. In the present embodiment, each of the first sensing groups G11, G12, G13, G14 and G15 includes the first touch sensors 122_1 of one column. The first driving signal 610 is applied to the second sensing group G21, and the second driving signal 620 is applied to the first sensing groups G11, G12, G13, G14 and G15. The driver circuit 110 can determine the folding angle of the foldable touch display panel 220 according to the capacitance variation of the first sensing groups G11, G12, G13, G14 and G15 and the second sensing group G21 when the foldable touch display panel 120 is folded.

Figure 7:
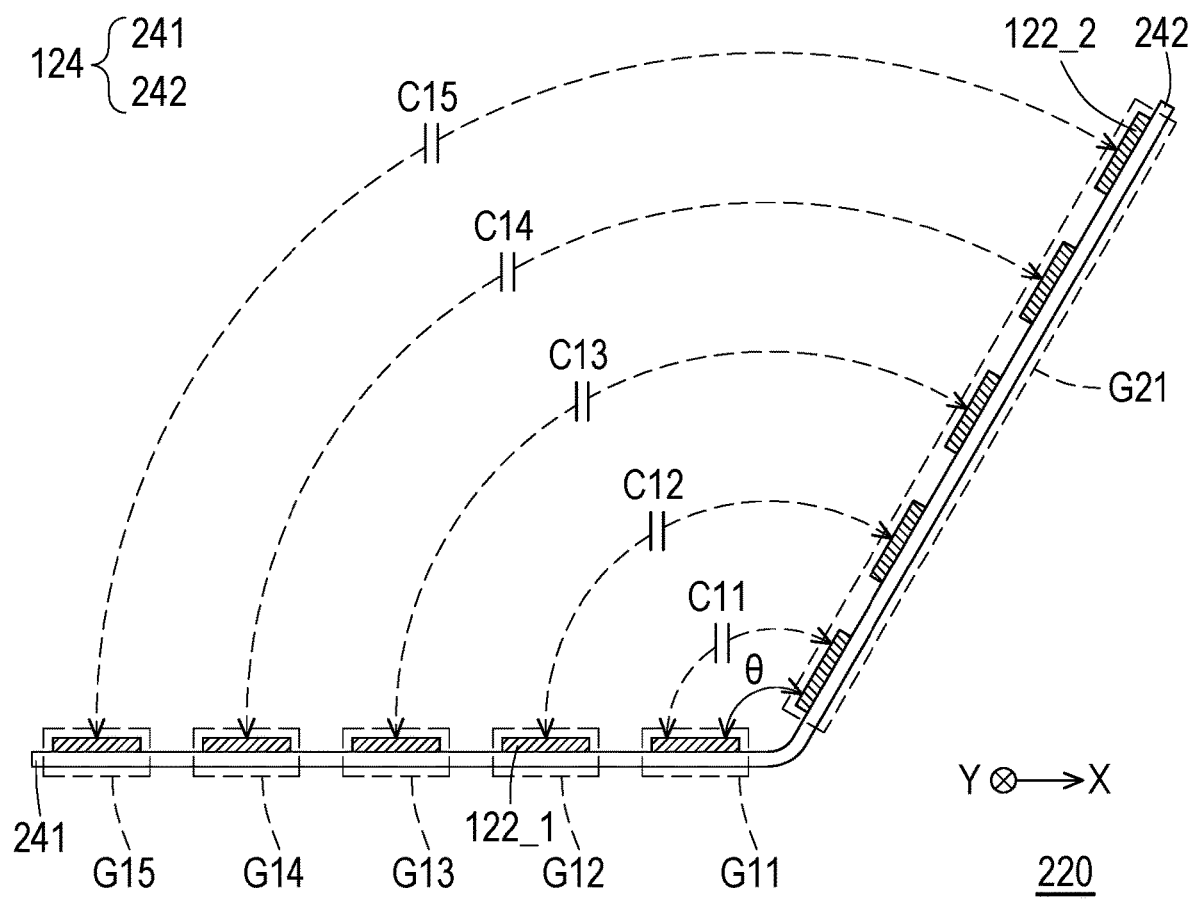
FIG. 7 illustrates the foldable touch display panel of FIG. 5B in the folded state according to an embodiment of the invention.

FIG. 7 illustrates the foldable touch display panel of FIG. 5B in the folded state according to an embodiment of the invention. The foldable touch display panel 220 is folded in a specified folding angle θ in FIG. 7. Referring to FIG. 7, respective capacitors with capacitance values C11, C12, C13, C14 and C15 are generated between the first sensing groups G11, G12, G13, G14 and G15 and the second sensing group G21. One of the capacitance values C11, C12, C13, C14 and C15 is selected to calculate capacitance variations. For example, the capacitance value C11 of the capacitor between the first sensing group G11 and the second sensing group G21 is selected to calculate the capacitance variation. The capacitance variation ΔC=C11−Cref is calculated, and thus the folding angle θ can be determined according to the lookup table or by interpolation thereof.

In other embodiments, one of the capacitance values C12, C13, C14 and C15 may be selected to calculate capacitance variations. In addition, an average of the capacitance values C11, C12, C13, C14 and C15 may also be selected to calculate capacitance variations.

Therefore, the capacitance variations may be calculated and stored in the lookup table, e.g. table 1, based on one of the capacitance values C11, C12, C13, C14 and C15 or the average of the capacitance values C11, C12, C13, C14 and C15 in advance. In an embodiment, a plurality of lookup tables may be generated to determine some folding angle θ, and the plurality of lookup tables respectively store the capacitance variations calculated based on the capacitance values C11, C12, C13, C14 and C15 and the average thereof. The folding angle θ can be determined according to the plurality of lookup tables.

Figure 8A:
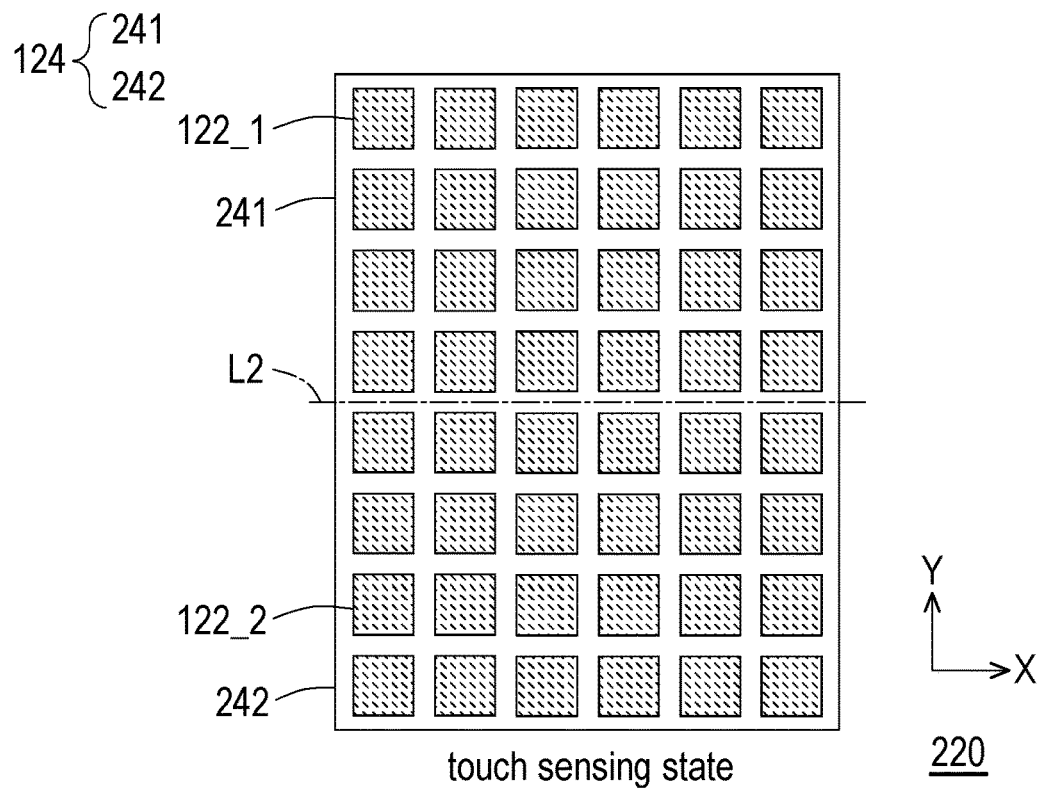
FIG. 8A illustrates the foldable touch display panel operating in the touch sensing state according to another embodiment of the invention.
Figure 8B:
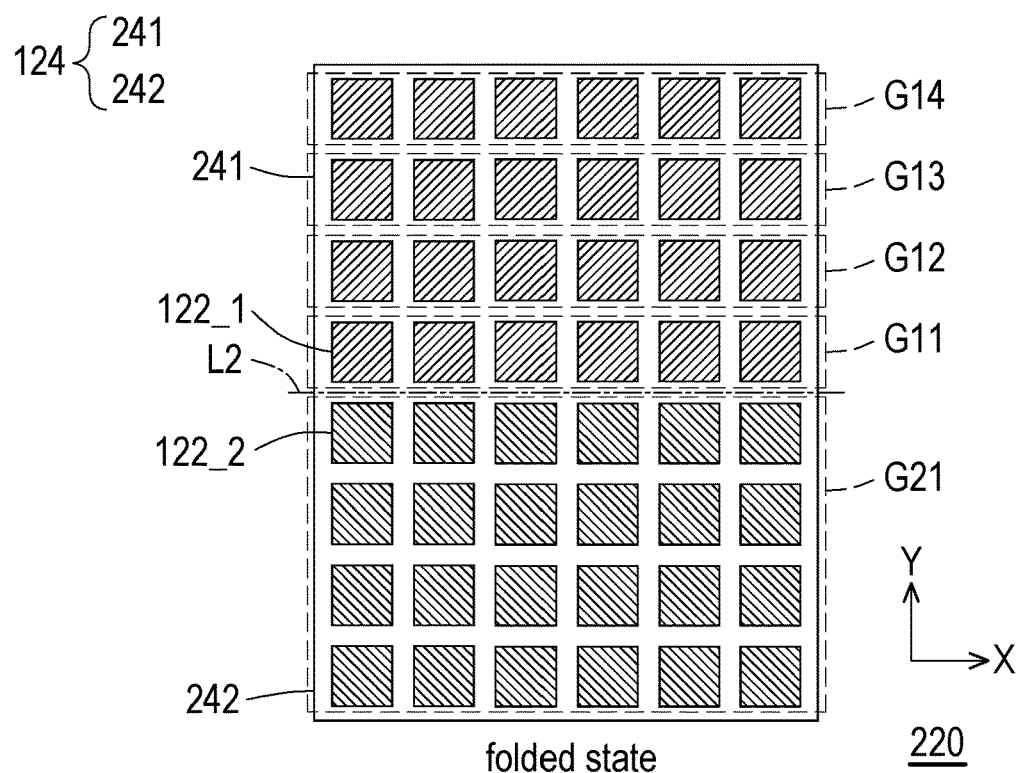
FIG. 8B illustrates the foldable touch display panel operating in the folded state according to another embodiment of the invention.

FIG. 8A illustrates the foldable touch display panel operating in the touch sensing state according to another embodiment of the invention. FIG. 8B illustrates the foldable touch display panel operating in the folded state according to another embodiment of the invention. Referring to FIG. 8A and FIG. 8B, in the present embodiment, the foldable touch display panel 220 is folded in the second direction Y with an axis L2 in the folded state, wherein the axis L2 is parallel to the first direction X.

The first touch sensors 122_1 are grouped into four first sensing groups G11, G12, G13 and G14, and the second touch sensors 122_2 are grouped into one second sensing group G21 in the folded state as illustrated in FIG. 8B. In the present embodiment, each of the first sensing groups G11, G12, G13 and G14 includes the first touch sensors 122_1 of one row. The first driving signal 610 is applied to the second sensing group G21, and the second driving signal 620 is applied to the first sensing groups G11, G12, G13 and G14. The driver circuit 110 can determine the folding angle of the foldable touch display panel 220 according to the capacitance variation of the first sensing groups G11, G12, G13 and G14 and the second sensing group G21 when the foldable touch display panel 220 is folded.

Figure 9:
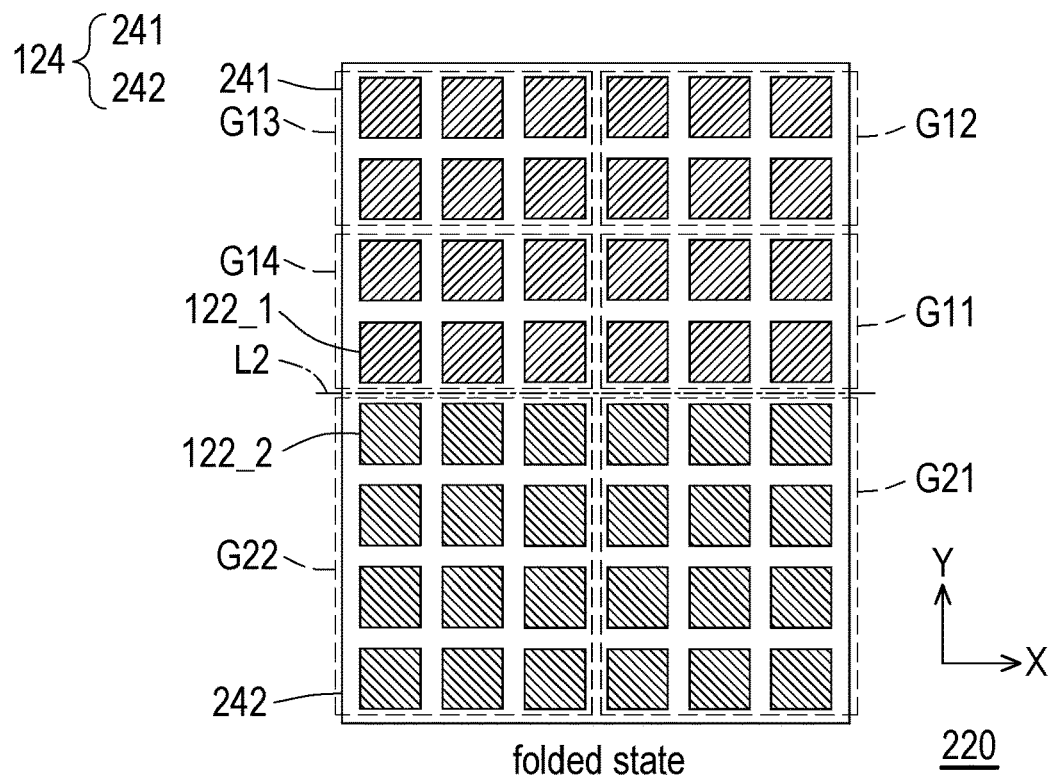
FIG. 9 illustrates the foldable touch display panel operating in the folded state according to another embodiment of the invention.

FIG. 9 illustrates the foldable touch display panel operating in the folded state according to another embodiment of the invention. Referring to FIG. 9, in the present embodiment, the foldable touch display panel 220 may also be folded in the second direction Y with the axis L2 in the folded state.

The first touch sensors 122_1 are grouped into four first sensing groups G11, G12, G13 and G14, and each of the first sensing groups G11, G12, G13 and G14 and G15 includes a plurality of first touch sensors 122_1 arranged in an array.

The second touch sensors 122_2 are grouped into two second sensing group G21 and G22 in the folded state, and each of the second sensing groups G21 and G22 includes a plurality of second touch sensors 122_2 arranged in an array.

The first driving signal 610 is applied to the second sensing groups G21 and G22, and the second driving signal 620 is applied to the first sensing groups G11, G12, G13 and G14. The driver circuit 110 can determine the folding angle of the foldable touch display panel 220 according to the capacitance variations of the first sensing groups G11 and G12 and the second sensing group G21 and/or the capacitance variations of the first sensing groups G13 and G14 and the second sensing group G22 when the foldable touch display panel 220 is folded.

Figure 10:
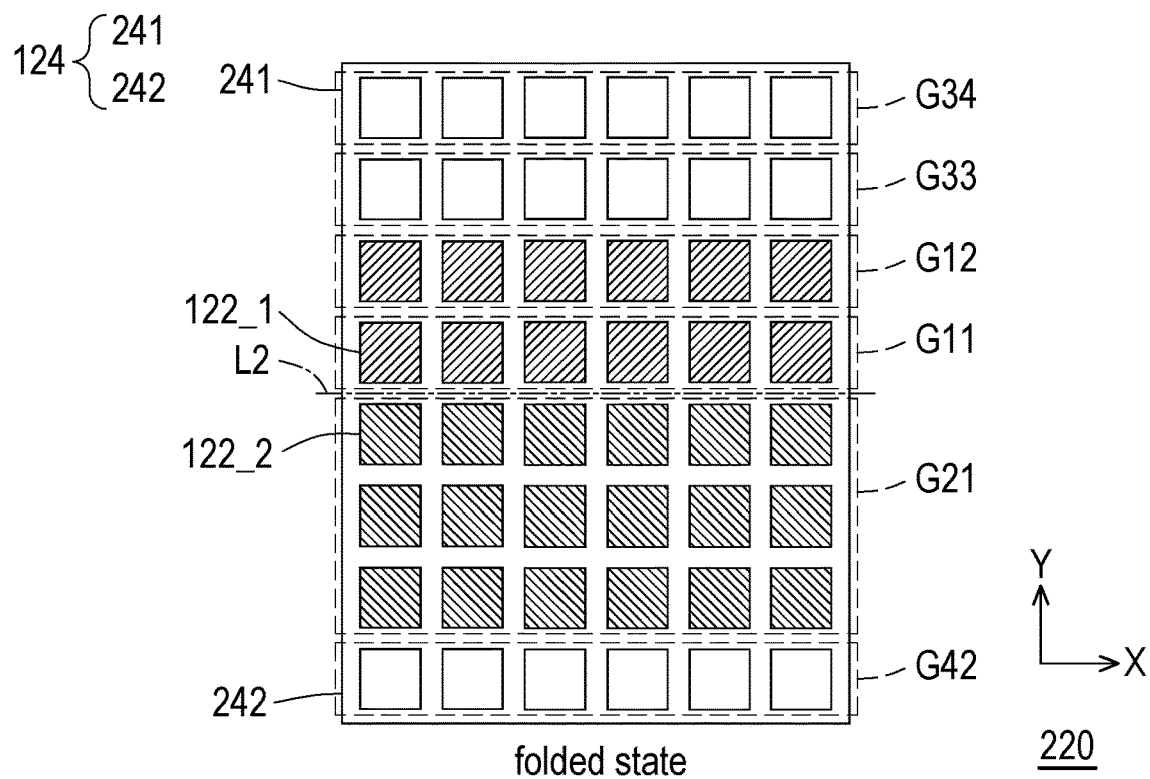
FIG. 10 illustrates the foldable touch display panel operating in the folded state according to another embodiment of the invention.
Figure 11:
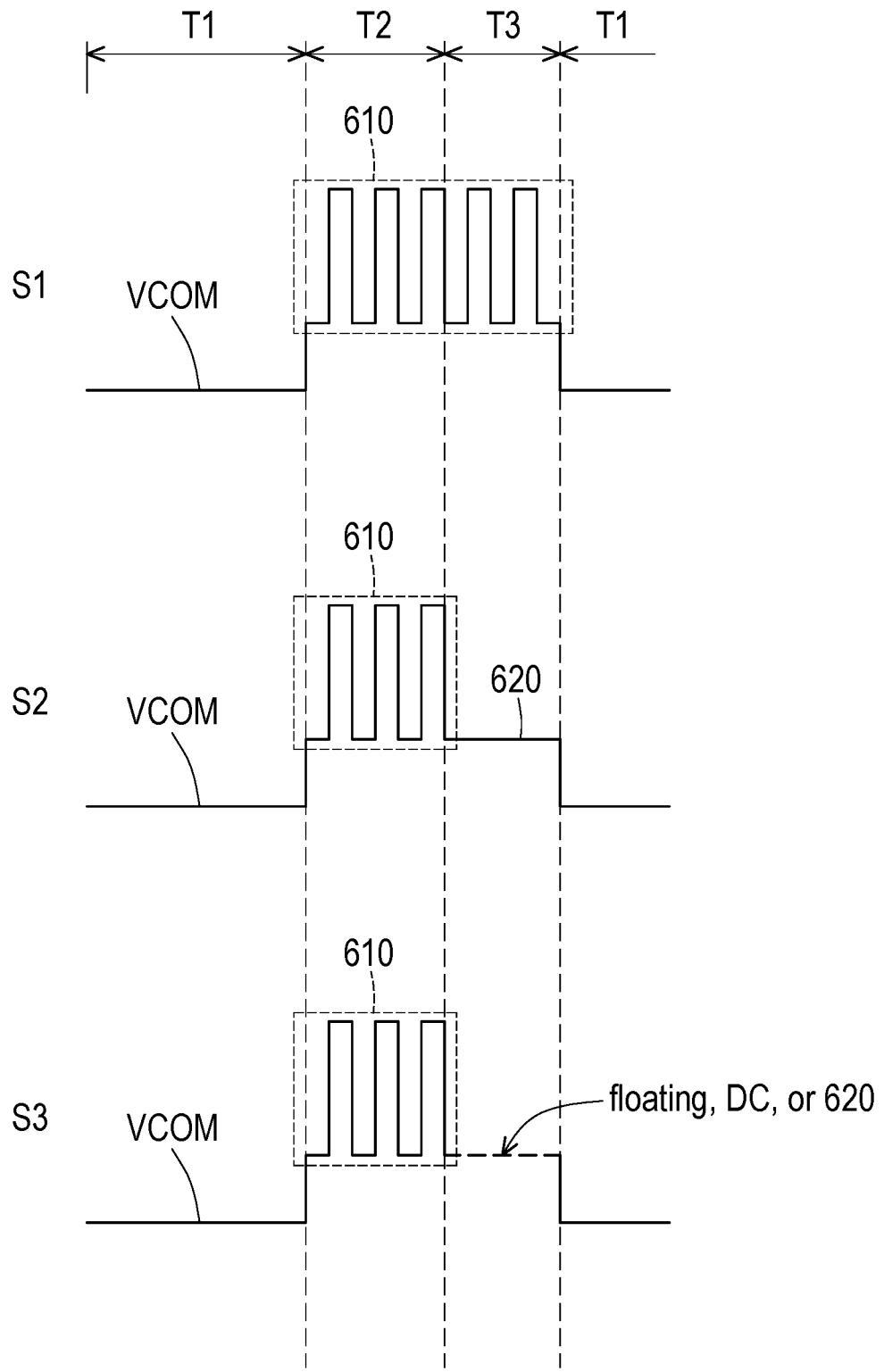
FIG. 11 illustrates driving signals for driving the foldable touch display panel of FIG. 10 according to another embodiment of the invention.

FIG. 10 illustrates the foldable touch display panel operating in the folded state according to another embodiment of the invention. FIG. 11 illustrates driving signals for driving the foldable touch display panel of FIG. 10 according to another embodiment of the invention.

Referring to FIG. 10 and FIG. 11, in the present embodiment, the foldable touch display panel 220 may also be folded in the second direction Y with the axis L2 in the folded state. The first touch sensors 122_1 are further grouped into at least one third sensing group G33 and G34, and the second touch sensors 122_2 are further grouped into at least one fourth sensing group G42. The third sensing groups G33 and G34 and the fourth sensing group G42 serve as dummy sensors and are not configured to determine the folding angle in the folded state T3.

To be specific, the first touch sensors 122_1 are grouped into two first sensing groups G11 and G12 and two third sensing groups G33 and G34. Each of the first sensing groups G11 and G12 and the third sensing groups G33 and G34 includes the first touch sensors 122_1 of one row. The second touch sensors 122_2 are grouped into one second sensing group G21 and one fourth sensing group G42. Each of the second sensing group G21 and the fourth sensing group G42 includes the second touch sensors 122_2 of one row.

The driver circuit 110 may further output a signal S3 to drive the foldable touch display panel 220 to perform the display operation in the display state T1 and the touch sensing operation in the touch sensing state T2. The signal S3 is applied to the first touch sensors 122_1 of the third sensing groups G33 and G34 and the second touch sensors 122_2 of the fourth sensing group G42 in the display state T1 and the touch sensing state T2.

In the folded state T3, a voltage of the first touch sensors 122_1 of the third sensing groups G33 and G34 and the second touch sensors 122_2 of the fourth sensing group G42 may be floating, a specified DC voltage, or the same as the second driving signal 620. The driver circuit 110 can determine the folding angle of the foldable touch display panel 220 according to the capacitance variations of the first sensing groups G11 and G12 and the second sensing group G21 when the foldable touch display panel 220 is folded.

Figure 12A:
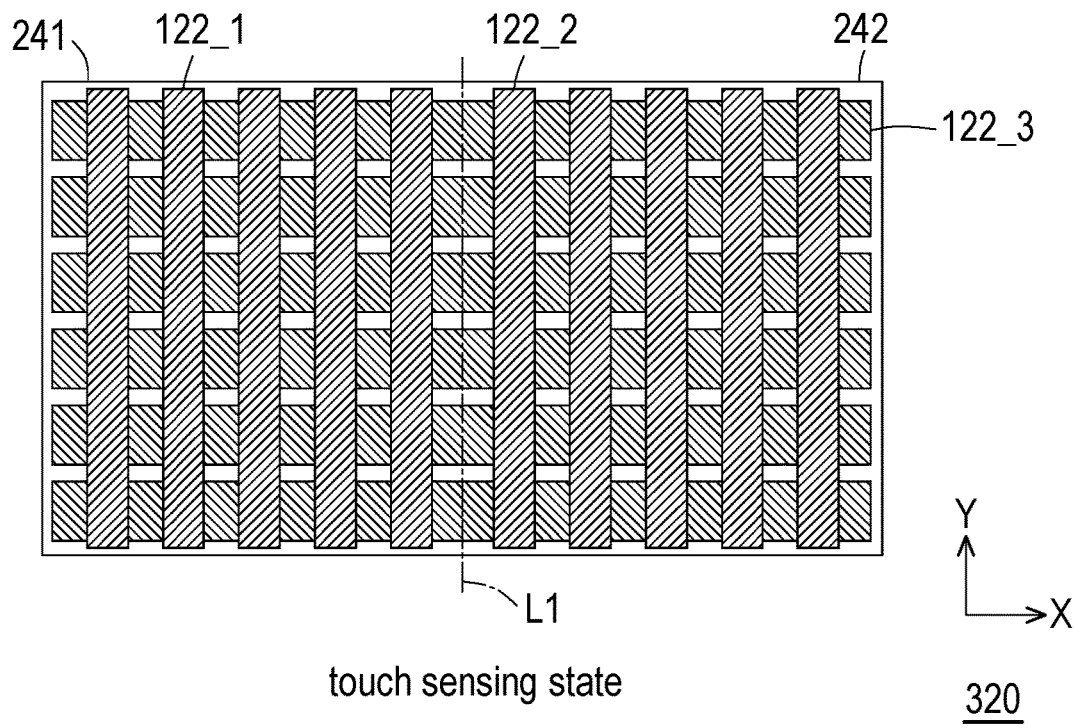
FIG. 12A illustrates a foldable touch display panel operating in the touch sensing state according to another embodiment of the invention.
Figure 12B:
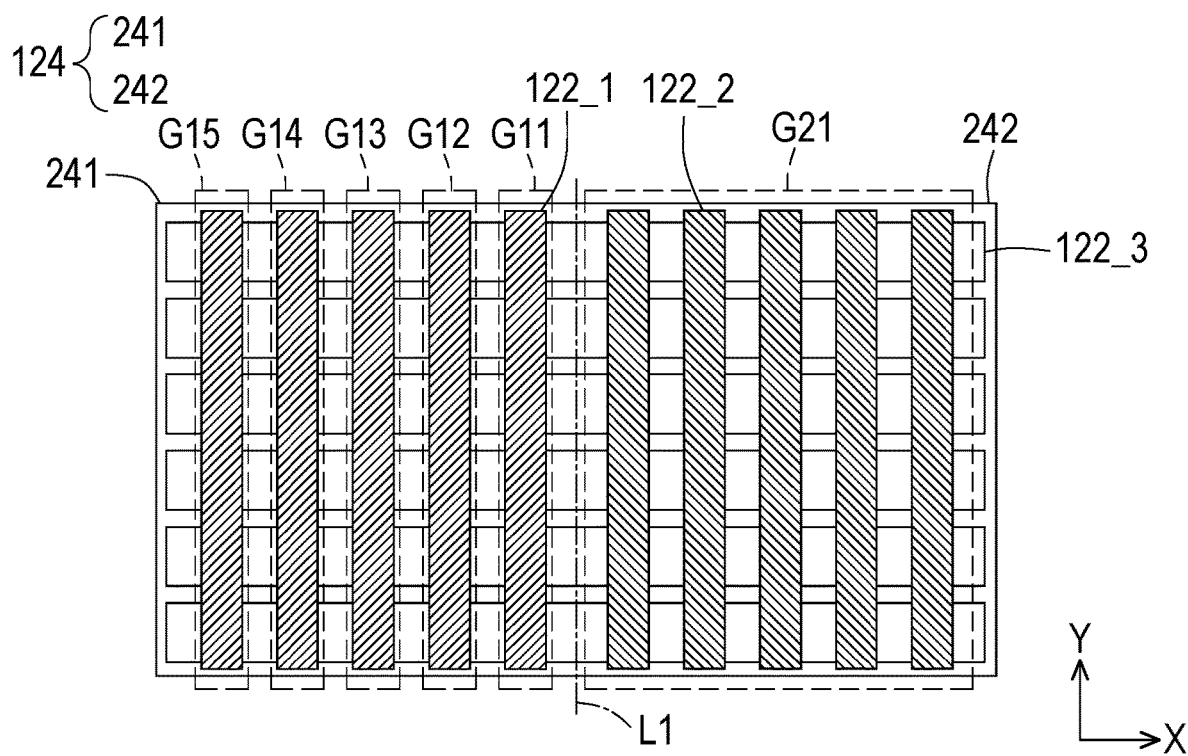
FIG. 12B illustrates the foldable touch display panel operating in the folded state according to another embodiment of the invention.
Figure 13:
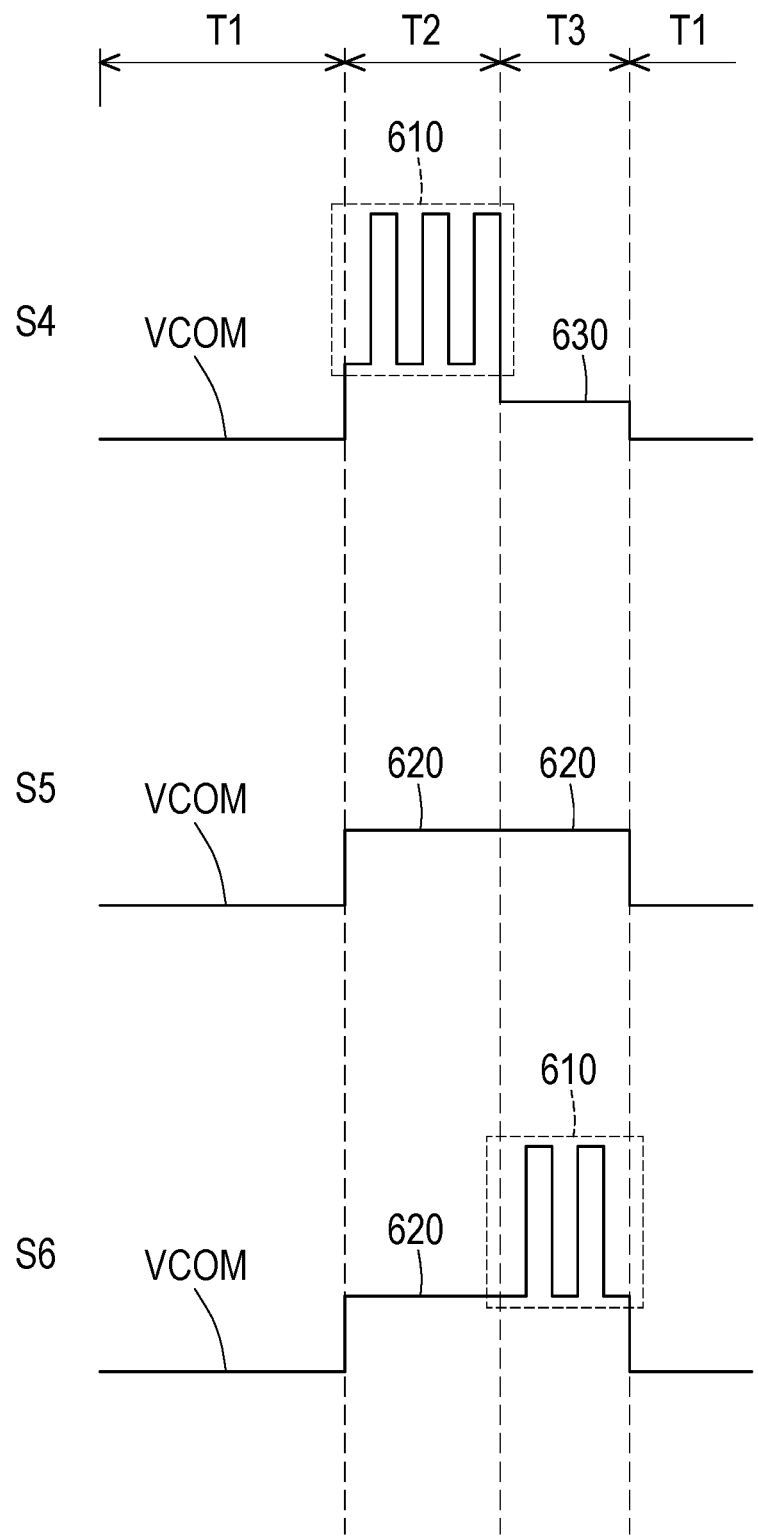
FIG. 13 illustrates driving signals for driving the foldable touch display panel of FIG. 12A and FIG. 12B according to another embodiment of the invention.

FIG. 12A illustrates a foldable touch display panel operating in the touch sensing state according to another embodiment of the invention. FIG. 12B illustrates the foldable touch display panel operating in the folded state according to another embodiment of the invention. FIG. 13 illustrates driving signals for driving the foldable touch display panel of FIG. 12A and FIG. 12B according to another embodiment of the invention.

Referring to FIG. 12A, FIG. 12B and FIG. 13, the foldable touch display panel 320 includes a plurality of first touch sensors 122_1, a plurality of second touch sensors 122_2, and a plurality of third touch sensors 122_3. The first touch sensors 122_1 are disposed on the first portion 241, and the second touch sensors 122_2 are disposed on the second portion 242. The first touch sensors 122_1 and the second touch sensors 122_2 extend along in the second direction Y. The third touch sensors 122_3 are disposed on the first portion 241 and the second portion 242 and extend along in the first direction X.

The driver circuit 110 may output signals S4, S5 and S6 to drive the foldable touch display panel 320 to perform the display operation in the display state T1 and the touch sensing operation in the touch sensing state T2. The signal S4 is applied to the third touch sensors 122_3. The signal S6 is applied to the second touch sensors 122_2, and the signal S5 is applied to the first touch sensors 122_1. The foldable touch display panel 320 may be folded in the folded state T3. In the present embodiment, the foldable touch display panel 320 is folded in the first direction X with the axis L1 in the folded state, wherein the axis L1 is parallel to the second direction Y. The first portion 241 and the second portion 242 face each other when the foldable touch display panel 320 is folded. In an embodiment, when the foldable touch display panel 320 is not folded, the folded state T3 is omitted in FIG. 13.

In the display state T1, the first touch sensors 122_1, the second touch sensors 122_2 and the third touch sensors 122_3 may serve as common electrodes, and the driver circuit 110 outputs the common voltage VCOM to drive the first touch sensors 122_1, the second touch sensors 122_2 and the third touch sensors 122_3 to perform the display operation in the display state T1.

In the touch sensing state T2, the driver circuit 110 outputs the first driving signal 610 and the second driving signal 620 to drive the first touch sensors 122_1, the second touch sensors 122_2 and the third touch sensors 122_3 to perform the touch sensing operation. The first driving signal 610 is applied to the third touch sensors 122_3, and the second driving signal 620 is applied to the first touch sensors 122_1 and the second touch sensors 122_2. The third touch sensors 122_3 serve as driving electrodes and receive driving signals from the driver circuit 110, and the first touch sensors 122_1 and the second touch sensors 122_2 serve as sensing electrodes and transmit sensing signals to the driver circuit 110.

In the folded state T3, the driver circuit 110 outputs the first driving signal 610, the second driving signal 620 and the third driving signal 630 to determine the folding angle between the first portion 241 and the second portion 242 of the foldable touch display panel 320. The first driving signal 610 is applied to the second touch sensors 122_2, and the second driving signal 620 is applied to the first touch sensors 122_1. The third driving signal 630 is applied to the third touch sensors 122_3. In the present embodiment, the second driving signal 620 is a DC voltage between the common voltage VCOM and the second driving signal 620. The folding angle may be determined according to the capacitance variation of the first touch sensors 122_1 and the second touch sensors 122_2.

To be specific, in the folded state T3, the first touch sensors 122_1 are grouped into at least one first sensing group, and the second touch sensors 122_2 are grouped into at least one second sensing group. For example, the first touch sensors 122_1 are grouped into five first sensing groups G11, G12, G13, G14 and G15, and the second touch sensors 122_2 are grouped into one second sensing group G21. In the present embodiment, each of the first sensing groups G11, G12, G13, G14 and G15 includes one first touch sensor 122_1, and the second sensing group G21 includes five second touch sensors 122_2. The first driving signal 610 is applied to the second sensing group G21, and the second driving signal 620 is applied to the first sensing groups G11, G12, G13, G14 and G15. The driver circuit 110 can determine the folding angle of the foldable touch display panel 320 according to the capacitance variation of the first sensing groups G11, G12, G13, G14 and G15 and the second sensing group G21 when the foldable touch display panel 320 is folded.

Figure 14A:
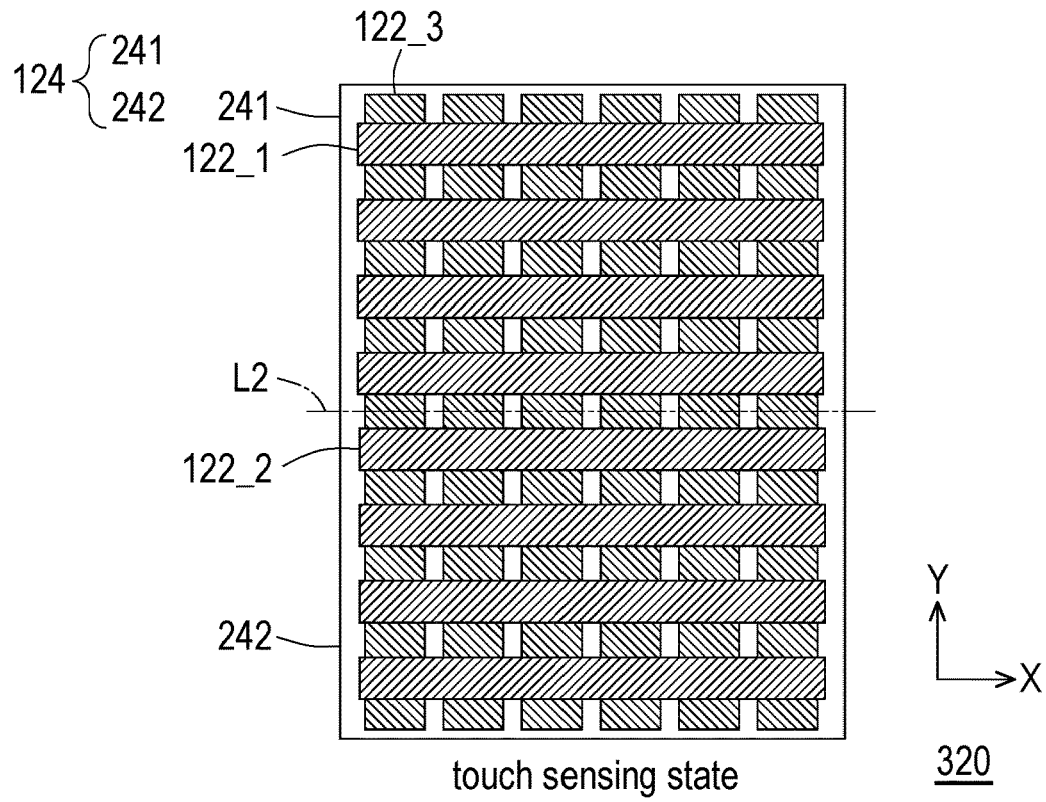
FIG. 14A illustrates the foldable touch display panel operating in the touch sensing state according to another embodiment of the invention.
Figure 14B:
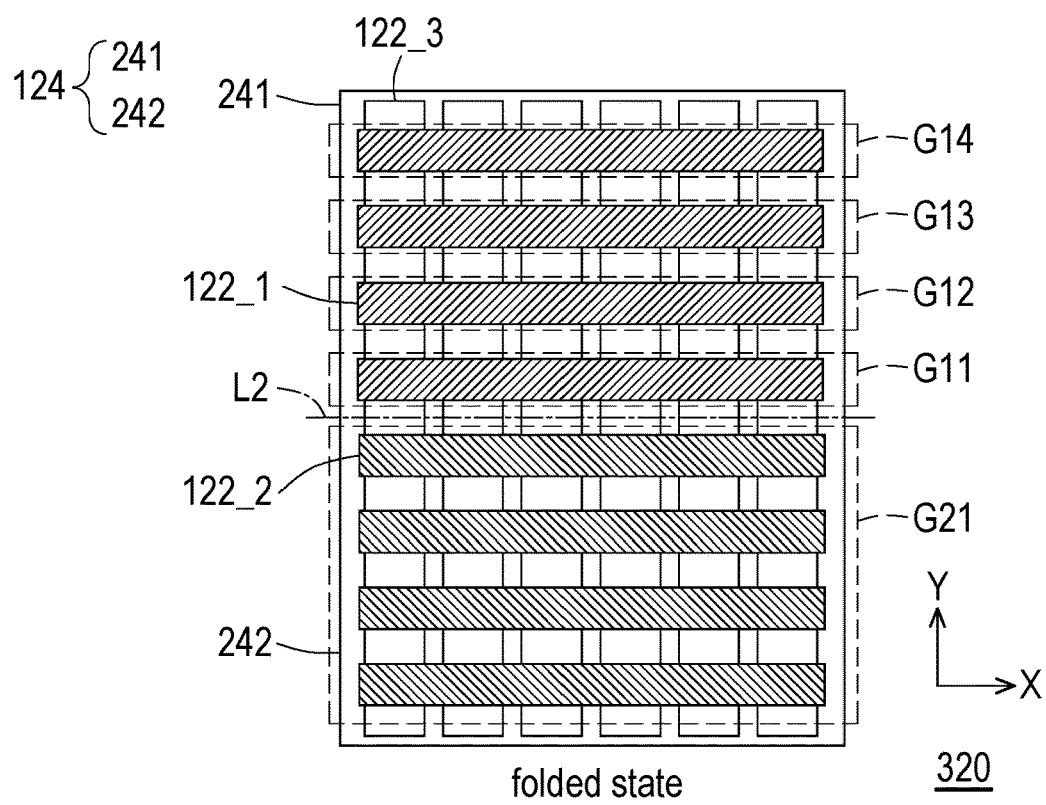
FIG. 14B illustrates the foldable touch display panel operating in the folded state according to another embodiment of the invention.

FIG. 14A illustrates the foldable touch display panel operating in the touch sensing state according to another embodiment of the invention. FIG. 14B illustrates the foldable touch display panel operating in the folded state according to another embodiment of the invention. Referring to FIG. 14A and FIG. 14B, in the present embodiment, the foldable touch display panel 220 is folded in the second direction Y with the axis L2 in the folded state.

The first touch sensors 122_1 are grouped into four first sensing groups G11, G12, G13 and G14, and the second touch sensors 122_2 are grouped into one second sensing group G21 in the folded state as illustrated in FIG. 14B. In the present embodiment, each of the first sensing groups G11, G12, G13 and G14 includes one first touch sensors 122_1, and the second sensing group G21 includes four second touch sensors 122_2. The first driving signal 610 is applied to the second sensing group G21, and the second driving signal 620 is applied to the first sensing groups G11, G12, G13 and G14. The driver circuit 110 can determine the folding angle of the foldable touch display panel 320 according to the capacitance variation of the first sensing groups G11, G12, G13 and G14 and the second sensing group G21 when the foldable touch display panel 320 is folded.

Figure 15:
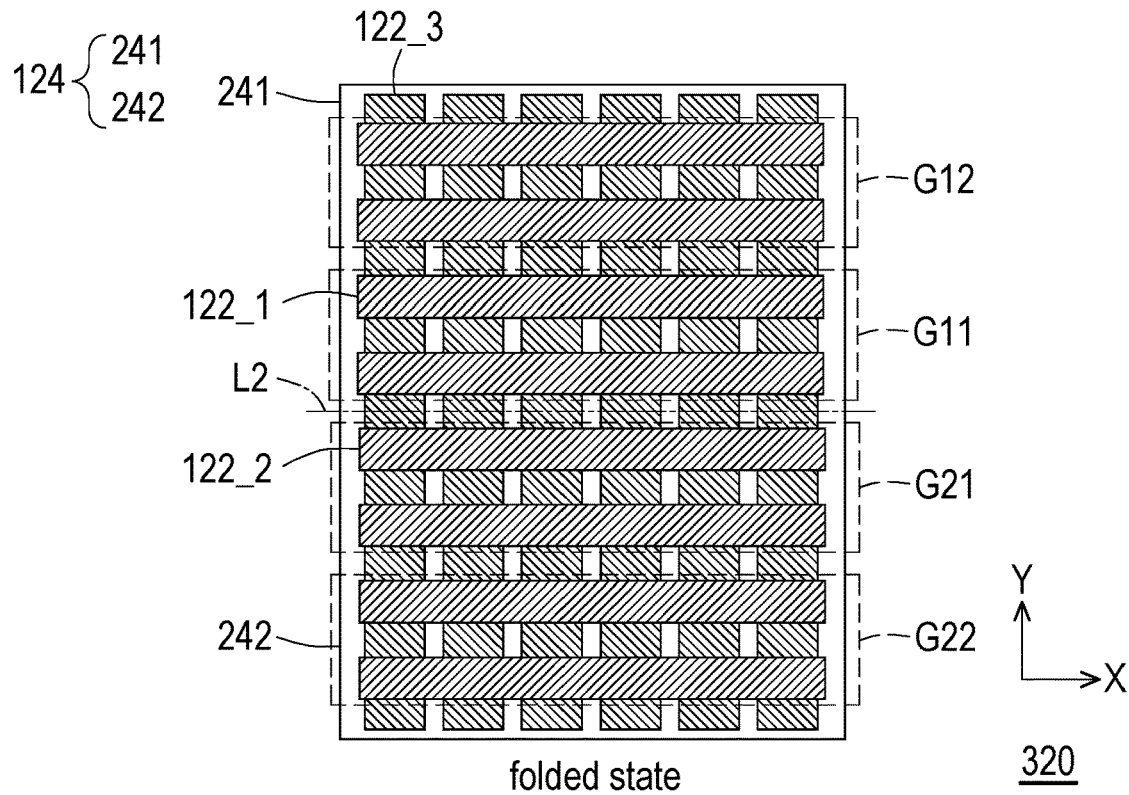
FIG. 15 illustrates the foldable touch display panel operating in the folded state according to another embodiment of the invention.

FIG. 15 illustrates the foldable touch display panel operating in the folded state according to another embodiment of the invention. Referring to FIG. 15, in the present embodiment, the foldable touch display panel 320 may also be folded in the second direction Y with the axis L2 in the folded state.

The first touch sensors 122_1 are grouped into two first sensing groups G11 and G12, and each of the first sensing groups G11 and G12 includes two first touch sensors 122_1. The second touch sensors 122_2 are grouped into two second sensing group G21 and G22 in the folded state, and each of the second sensing groups G21 and G22 includes two second touch sensors 122_2.

The first driving signal 610 is applied to the second sensing groups G21 and G22, and the second driving signal 620 is applied to the first sensing groups G11 and G12. The driver circuit 110 can determine the folding angle of the foldable touch display panel 320 according to the capacitance variations of the first sensing group G11 and the second sensing group G21 and/or the capacitance variations of the first sensing group G12 and the second sensing group G22 when the foldable touch display panel 320 is folded.

Figure 16:
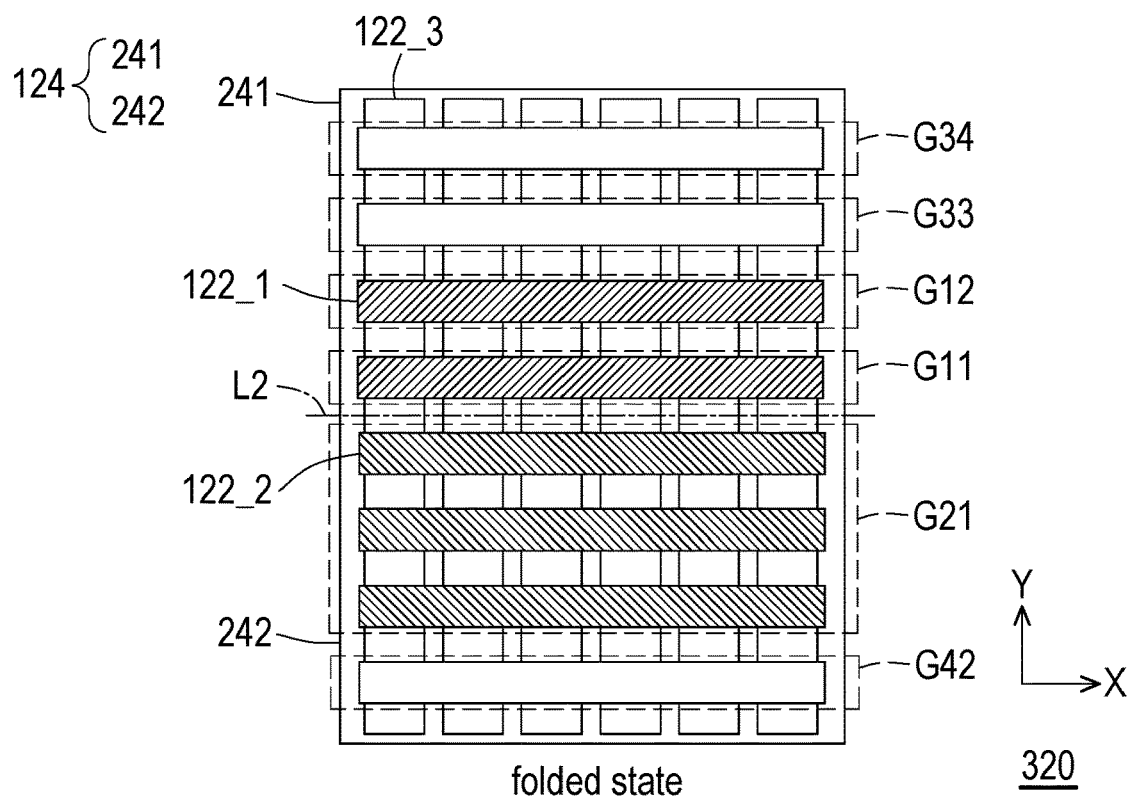
FIG. 16 illustrates the foldable touch display panel operating in the folded state according to another embodiment of the invention.
Figure 17:
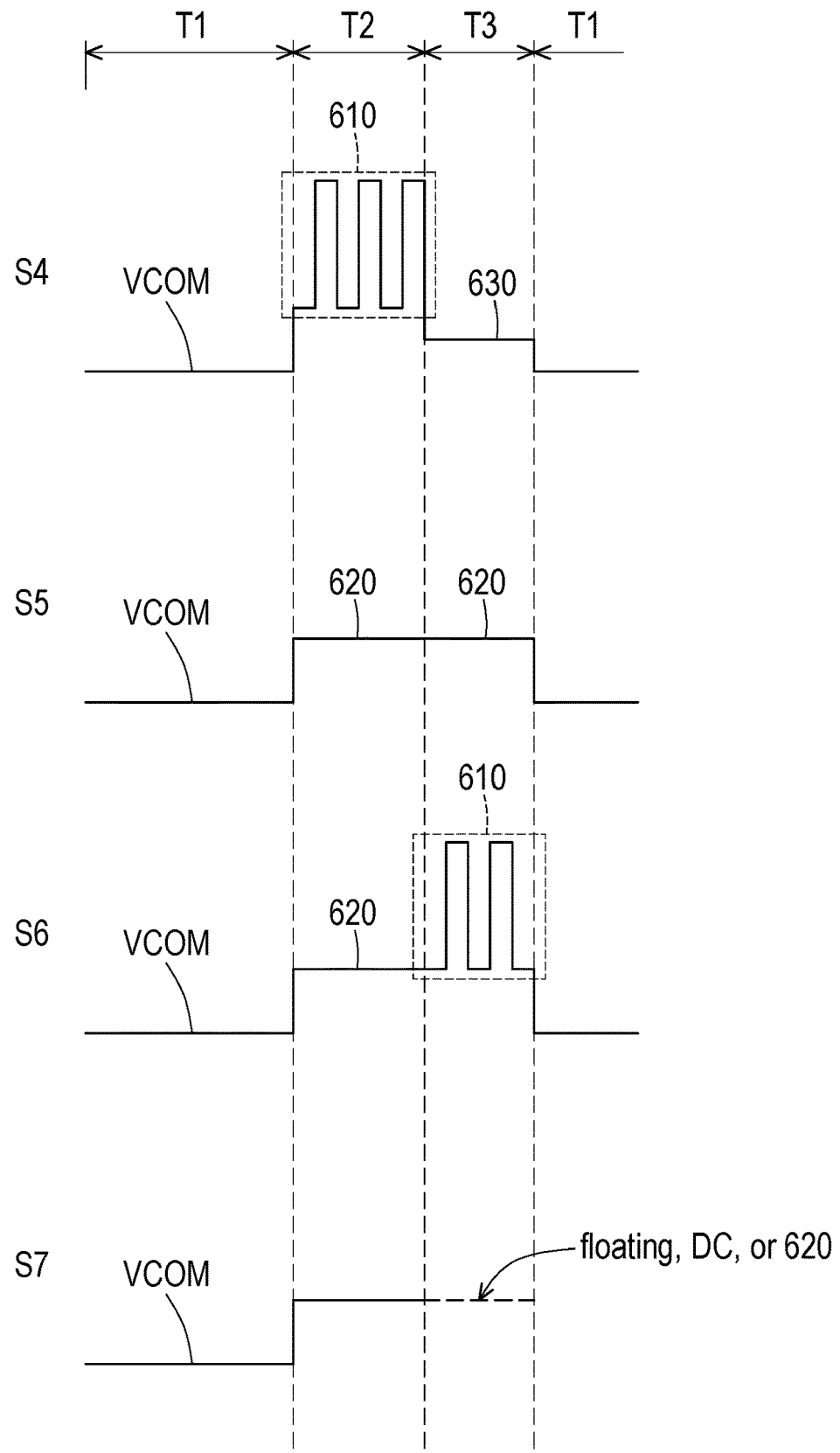
FIG. 17 illustrates driving signals for driving the foldable touch display panel of FIG. 16 according to another embodiment of the invention.

FIG. 16 illustrates the foldable touch display panel operating in the folded state according to another embodiment of the invention. FIG. 17 illustrates driving signals for driving the foldable touch display panel of FIG. 16 according to another embodiment of the invention.

Referring to FIG. 16 and FIG. 17, in the present embodiment, the foldable touch display panel 320 may also be folded in the second direction Y with the axis L2 in the folded state. The first touch sensors 122_1 are further grouped into at least one third sensing group G33 and G34, and the second touch sensors 122_2 are further grouped into at least one fourth sensing group G42. The third sensing groups G33 and G34 and the fourth sensing group G42 serve as dummy sensors and are not configured to determine the folding angle in the folded state T3.

To be specific, the first touch sensors 122_1 are grouped into two first sensing groups G11 and G12 and two third sensing groups G33 and G34. Each of the first sensing groups G11 and G12 and the third sensing groups G33 and G34 includes one first touch sensor 122_1. The second touch sensors 122_2 are grouped into one second sensing group G21 and one fourth sensing group G42. Each of the second sensing group G21 and the fourth sensing group G42 includes one second touch sensor 122_2.

The driver circuit 110 may further output a signal S7 to drive the foldable touch display panel 320 to perform the display operation in the display state T1 and the touch sensing operation in the touch sensing state T2. The signal S7 is applied to the first touch sensors 122_1 of the third sensing groups G33 and G34 and the second touch sensors 122_2 of the fourth sensing group G42 in the display state T1 and the touch sensing state T2.

In the folded state T3, a voltage of the first touch sensors 122_1 of the third sensing groups G33 and G34 and the second touch sensors 122_2 of the fourth sensing group G42 may be floating, a specified DC voltage, or the same as the second driving signal 620. The driver circuit 110 can determine the folding angle of the foldable touch display panel 320 according to the capacitance variations of the first sensing groups G11 and G12 and the second sensing group G21 when the foldable touch display panel 320 is folded.

In summary, in the embodiments of the invention, the existing touch sensors of the foldable touch display panel is used to replace Hall sensors and gravity sensors for detecting the folding angle. This saves component space and costs, as well as reduces electromagnetic interference in the electronic device. Using the proposed driving method, the electrical properties of the existing touch sensors are redefined in the folded state to effectively detect the folding angle.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A foldable touch display panel, comprising:
   a foldable substrate, comprising a first portion and a second portion, wherein the first portion and the second portion face each other in a folded state;
   a plurality of first touch sensors, disposed on the first portion of the foldable substrate; and
   a plurality of second touch sensors, disposed on the second portion of the foldable substrate,
   wherein a folding angle between the first portion and the second portion is determined according to a capacitance variation of the first touch sensors and the second touch sensors,
   wherein in the folded state, the first touch sensors are grouped into at least one first sensing group and the second touch sensors are grouped into at least one second sensing group, wherein the angle folding is determined according to the capacitance variation of the at least one first sensing group and the at least one second sensing group,
   wherein in the folded state, a first driving signal is applied to the at least one second sensing group and a second driving signal is applied to the at least one first sensing group to determine the folding angle, wherein the second driving signal is different from the first driving signal.

2. The foldable touch display panel of claim 1, wherein the first driving signal is applied to the first touch sensors and the second touch sensors to perform a touch sensing operation in a touch sensing state.

3. The foldable touch display panel of claim 1, further comprising:
a plurality of third touch sensors, disposed on the first portion and the second portion of the foldable substrate, wherein the first driving signal is applied to the third touch sensors to perform a touch sensing operation in a touch sensing state.

4. The foldable touch display panel of claim 3, wherein the second driving signal is applied to the first touch sensors and the second touch sensors to perform the touch sensing operation in the touch sensing state.

5. The foldable touch display panel of claim 3, wherein a third driving signal is applied to the third touch sensors in the folded state.

6. The foldable touch display panel of claim 1, wherein the first touch sensors are further grouped into at least one third sensing group, and the at least one third sensing group serve as dummy sensors and are not configured to determine the folding angle in the folded state.

7. The foldable touch display panel of claim 1, wherein the second touch sensors are further grouped into at least one fourth sensing group, and the at least one fourth sensing group serve as dummy sensors and are not configured to determine the folding angle in the folded state.

8. The foldable touch display panel of claim 1, wherein the folding angle decreases as the capacitance variation increases.

9. An electronic device, comprising:
a foldable touch display panel, comprising:
a foldable substrate, comprising a first portion and a second portion,
wherein the first portion and the second portion face each other in a folded state;
a plurality of first touch sensors, disposed on the first portion of the foldable substrate; and
a plurality of second touch sensors, disposed on the second portion of the foldable substrate; and
a driver circuit, coupled to the foldable touch display panel, and configured to drive the foldable touch display panel to perform a touch sensing operation in a touch sensing state, and determine a folding angle between the first portion and the second portion according to a capacitance variation of the first touch sensors and the second touch sensors in the folded state,
wherein in the folded state, the first touch sensors are grouped into at least one first sensing group and the second touch sensors are grouped into at least one second sensing group, wherein the driver circuit determines the folding angle according to the capacitance variation of the at least one first sensing group and the at least one second sensing group,
wherein the driver circuit outputs a first driving signal and a second driving signal to determine the folding angle in the folded state, the first driving signal is applied to the at least one second sensing group, and the second driving signal is applied to the at least one first sensing group, wherein the second driving signal is different from the first driving signal.

10. The electronic device of claim 9, wherein the driver circuit outputs the first driving signal to drive the first touch sensors and the second touch sensors to perform the touch sensing operation in the touch sensing state.

11. The electronic device of claim 9, wherein the foldable touch display panel further comprises:
a plurality of third touch sensors, disposed on the first portion and the second portion of the foldable substrate, wherein the driver circuit outputs the first driving signal to drive the third touch sensors to perform the touch sensing operation in the touch sensing state.

12. The electronic device of claim 11, wherein the driver circuit outputs the second driving signal to drive the first touch sensors and the second touch sensors to perform the touch sensing operation in the touch sensing state.

13. The electronic device of claim 11, wherein the driver circuit outputs a third driving signal to the third touch sensors in the folded state.

14. The electronic device of claim 9, wherein the first touch sensors are further grouped into at least one third sensing group, the second touch sensors are further grouped into at least one fourth sensing group, and the at least one third sensing group and the at least one fourth sensing group serve as dummy sensors and are not configured to determine the folding angle in the folded state.

15. The electronic device of claim 9, wherein the folding angle decreases as the capacitance variation increases.

16. A driver circuit, coupled to a foldable touch display panel comprising a plurality of first touch sensors and a plurality of second touch sensors and configured to drive the foldable touch display panel to perform a touch sensing operation in a touch sensing state
wherein in a folded state, the first touch sensors are grouped into at least one first sensing group and the second touch sensors are grouped into at least one second sensing group, wherein the driver circuit determines a folding angle of the foldable touch display panel according to a capacitance variation of the at least one first sensing group and the at least one second sensing group,
wherein the driver circuit outputs a first driving signal and a second driving signal to determine the folding angle in the folded state, the first driving signal is applied to the at least one second sensing group, and the second driving signal is applied to the at least one first sensing group, wherein the second driving signal is different from the first driving signal.

* * * * *